June 7, 1960

R. P. LAPSLEY ET AL 2,939,903

HIGH-FREQUENCY, AIR-DIELECTRIC CABLE

Filed Aug. 11, 1958

INVENTORS
RHEA P. LAPSLEY
ROBERT G. FELLER
BY
James L. Bethell
ATTORNEY

June 7, 1960     R. P. LAPSLEY ET AL     2,939,903
HIGH-FREQUENCY, AIR-DIELECTRIC CABLE
Filed Aug. 11, 1958                               5 Sheets-Sheet 2

INVENTORS
RHEA P. LAPSLEY
ROBERT G. FELLER
BY James G. Bethell
ATTORNEY

June 7, 1960   R. P. LAPSLEY ET AL   2,939,903
HIGH-FREQUENCY, AIR-DIELECTRIC CABLE
Filed Aug. 11, 1958   5 Sheets-Sheet 3

INVENTORS
RHEA P. LAPSLEY
BY ROBERT G. FELLER

*James G. Bechell*

ATTORNEY

June 7, 1960 R. P. LAPSLEY ET AL 2,939,903
HIGH-FREQUENCY, AIR-DIELECTRIC CABLE
Filed Aug. 11, 1958 5 Sheets-Sheet 4

INVENTORS
RHEA P. LAPSLEY
ROBERT G. FELLER
BY *James G. Bethell*
ATTORNEY

June 7, 1960 R. P. LAPSLEY ET AL 2,939,903
HIGH-FREQUENCY, AIR-DIELECTRIC CABLE
Filed Aug. 11, 1958 5 Sheets-Sheet 5

INVENTORS
RHEA P. LAPSLEY
ROBERT G. FELLER
BY James G. Bethell
ATTORNEY

1

United States Patent Office 2,939,903
Patented June 7, 1960

2,939,903

HIGH-FREQUENCY, AIR-DIELECTRIC CABLE

Rhea P. Lapsley, Ridgewood, and Robert G. Feller, Clifton, N.J., assignors to The Okonite Company, Passaic, N.J., a corporation of New Jersey Filed Aug. 11, 1958, Ser. No. 754,347

15 Claims. (Cl. 174—28)

Our invention concerns improvements in so-called air-dielectric cables, such as are used for transmission of signals or electric energy at high frequencies.

In conventional designs of such cables, a round central conductor, usually of copper, is supported concentrically within a metallic sheath, which is usually of solid aluminum or copper, this sheath acting as the return conductor. Various forms of insulating supports for the central conductor have been used. For example, a multiplicity of insulating discs have been spaced at intervals along the central conductor to hold the conductor centrally within the sheath. In other designs various forms of filaments are spiraled around the central conductor to support it centrally within the sheath or outer conductor, or tubes of insulating media are used straight away or spiraled around the central conductor to support it. There is a considerable energy loss in the various insulations used for supports to hold the central conductor, and the area of contact of the insulation with the central conductor is kept as small as possible in order to reduce this energy loss within the insulation to a minimum. The area of contact of the insulation support with the sheath does not appear to be so critical. However, there is far more dielectric loss in the insulation material than there is in air, and, hence, all designs attempt to support the central conductor in such fashion that there is a minimum of insulation material and a maximum of air touching the central conductor or being used in the dielectric field between the inner and outer conductors.

Relatively large amounts of energy are also dissipated within the central conductor due primarily to its relatively small circumference as compared to the outer conductor or sheath, and, consequently, there is relatively high current density at the conductor skin surface.

These energy losses increase the attenuation and decrease the efficiency of the cable.

It is an object of our invention to provide air-dielectric, high-frequency cable constructions in which the energy losses in the insulation supports are much lower than in conventional designs.

It is a further object of our invention to provide air-dielectric, high-frequency cable constructions in which energy losses are low in the central conductor within the frequency range for which designed.

It is also an object of our invention to provide cable constructions which have low attenuation and high transmission efficiency.

In high-frequency cables of the two-conductor concentric design it is well known that the current travels on the outer surface of the inner conductor and on the inner surface of the outer conductor. It is also well known that the depth of penetration of the current into the surface of the conductor varies with frequency and conductor material but is very small—in the order of 5 mils to .5 mil or the like, for example—at high frequencies, depending on conductor material and frequency, so that having the conductor wall much thicker than this is wasteful, except for mechanical reasons.

2

Where high power is desired to be carried or where the loss per unit length of line of conventional design is desired to be reduced, it has been necessary to go to larger diameter of central conductor, which, to maintain the desired characteristic impedance, requires that the cable be of very large outside diameter.

It should be noted also that, inasmuch as the central conductor is of relatively small circumference and is carrying the entire current on its surface, current density and voltage stress get very high at the conductor surface, and as the supports for the central conductor contact the central conductor at its surface, considerable energy is dissipated into the insulation supports in exciting the molecules of the insulation where they contact the conductors. The amount of energy so dissipated is related to current density and voltage stress, for it is known that insulation contacting the outer conductor or sheath, where current density and voltage stress are lower than at the surface of the central conductor, does not absorb nearly so much energy.

We have found that, where a circular central conductor is enclosed concentrically within a circular sheath and is supported in this position by longitudinal supports of dielectric material, the current shifts to a non-uniform condition, concentrating most densely under the supports and less densely in the conductor surfaces between supports. This movement of current within the conductors causes higher losses in the cable. Our invention provides means for forcing the current to flow more uniformly over the conductor surfaces between supports, with minimum current flowing in the areas of the conductors under the supports, thereby reducing losses in the conductors and in the dielectric, so that, for the first time, it is possible to make non-circular, high-frequency cables. This permits greater-capacity cables which are still small enough to be wound on their minor axes.

In the accompanying drawings, where several embodiments of our invention have been illustrated:

Figure 1:
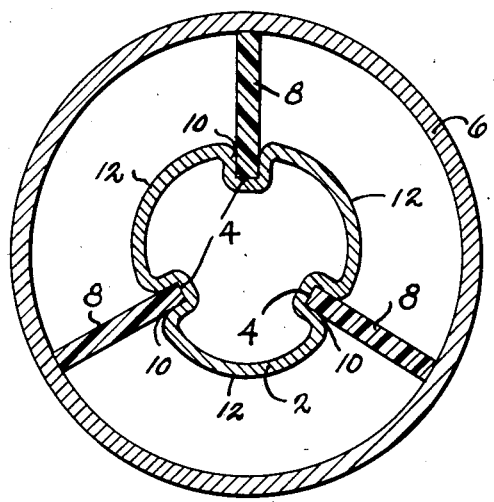
Fig. 1 is a cross-section of one form of our invention.

Referring to the drawings in detail and, first of all, to the embodiment of our invention as illustrated in Fig. 1.

2 designates the central conductor of our improved air-dielectric, high-frequency cable. This conductor may be in the form of a tube of copper, for example, as illustrated, or it may be a solid metallic rod. About the periphery of the central conductor 2 the conductor surface is provided with indentations 4, extending straight away along the conductor. These indentations are equally spaced from each other, may vary in number from that illustrated, and are readily formed in the conductor by drawing or by rolling the conductor through suitably shaped dies or rolls.

6 designates the outer conductor or metal sheath of our improved cable, and the central conductor 2 is supported centrally within this outer conductor by supports 8 of insulation. These supports fit into the indentations 4 in the surface of the central conductor and are of a material having a low specific inductive capacity and power factor, such as polyethylene, styrene, and the like.

In operation of our improved cable, the current tends to travel on the outer skin of the inner or central conductor 2 and return on the inner skin of the outer conductor 6. These are the portions of the two current-carrying parts that are in closest proximity to each other. It has been found that depth of penetration into the skin of the two conductors 2 and 6 is an inverse function of inductance, which depends on distance of the two currents from each other as well as on frequency and on the material of the conductors. It has been found also that, at high frequencies, a relatively shallow indentation, such as the indentation 4, which increases the distance between the inner and outer conductors at the indentations, forestalls high-frequency currents from running down into the indentations. Thus, by having the supports 8 extend into the indentations 4, the supports contact the central conductor 2 at points of minimum current density, and the electrical losses in the supports 8 will be substantially reduced.

It is well known, of course, that like currents have a tendency to repel each other, while unlike currents have a tendency to attract each other. We have found that, when a circular outer conductor or sheath, such as 6, is used with an indented but otherwise circular inner conductor 2, the current at high frequencies tends to be denser near the curvatures 10 immediately adjacent the indentations 4 and less dense on the surface of the conductor 2 at area 12 midway between the curvatures 10. To compensate for this tendency and to spread the current more evenly on the surface of the conductor 2 between the curvatures 10, we make the space between inner conductor 2 and outer conductor 6 slightly less at 12 than at 10. This can be done readily by having the central conductor gradually bow outwardly between adjacent indentations, as shown in Fig. 1, instead of being circular, the minimum distance between the two conductors being reached at 12, midway between each pair of adjacent curvatures 10. Conversely, of course, the outer conductor or sheath 6 can be formed to approach the inner conductor at the area midway between each pair of curvatures 10.

Figure 2:
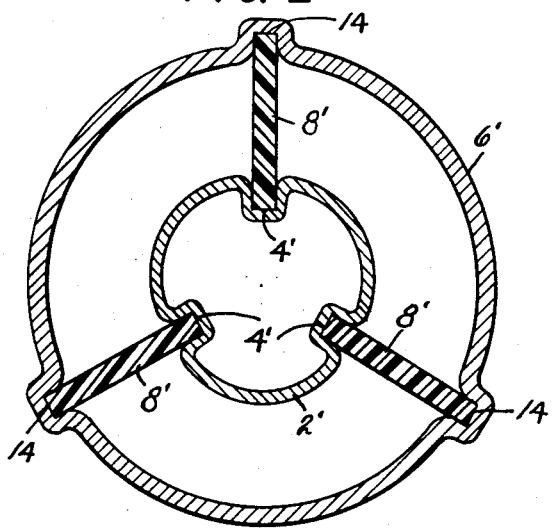
Fig. 2 is a cross-section of another form or embodiment of our invention.

In Fig. 2 we have illustrated a construction in which the inner conductor 2' is provided with indentations 4' and the outer conductor 6' with indentations 14, to receive the insulating supports 8'. In like manner to Fig. 1, the inner conductor is bowed outwardly between adjacent supports, instead of being circular, to distribute current flow more evenly over the conductor surface. Conversely of course, the outer conductor may be made to approach the inner conductor more closely between supports. This, it will be appreciated, provides a construction in which the radial distance between conductors 2' and 6' at the supports 8' exceeds the radial distance between 2' and 6' at any other point.

Figure 3:
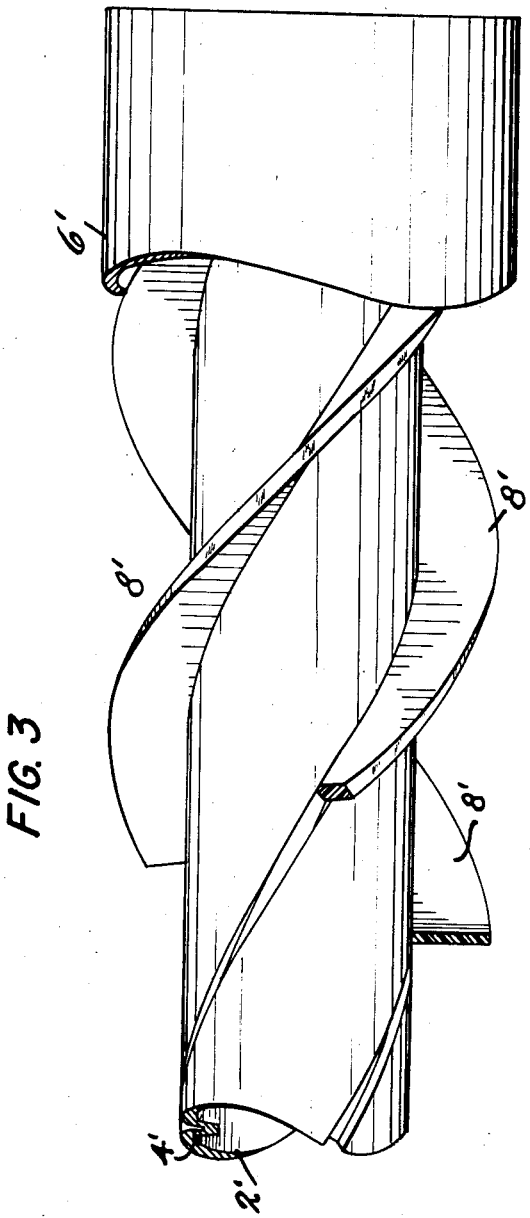
Fig. 3 is a part-sectional view of still another embodiment of our invention in which the insulating supports for the central conductor spiral about the conductor instead of extending straight away, as in Fig. 1, for example.

With reference to the embodiment of our invention illustrated in Fig. 3 of the drawings, it will be seen from an inspection of this showing that the central conductor 2' is supported within the outer conductor or sheath 6' by insulating supports 8', which extend into the indentations 4' with which the central conductor 2' is provided.

In the embodiment of Fig. 1 the conductor identations and the insulating supports extend straight away, but in Fig. 3 the indentations 4' and the supports 8' are spiraled about the central conductor and the central conductor and the outer conductor or sheath are in closest proximity midway between supports. The operation of a cable so constructed is, in general, the same as discussed in connection with Fig. 1. However, the fact that the current in the central conductor 2' spirals around the conductor surface, due to the spiral disposition of the insulating supports 8', adds inductance to the circuit. Therefore, a cable with a given size inner conductor and desired impedance characteristic can have a somewhat smaller-diameter sheath or outer conductor if the cable is constructed as in Fig. 3 instead of as in Fig. 1.

Figure 5:
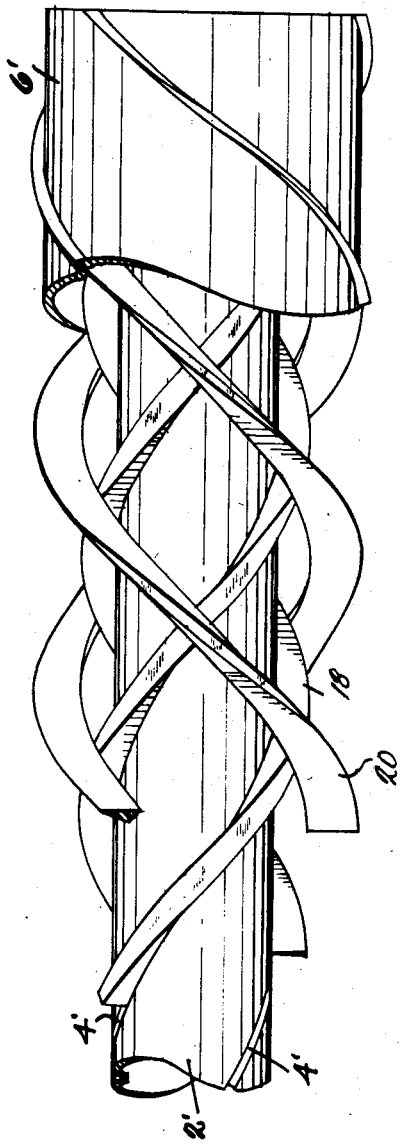
Fig. 5 is a side elevation, in part section, of the cable of Fig. 4.
Figure 4:
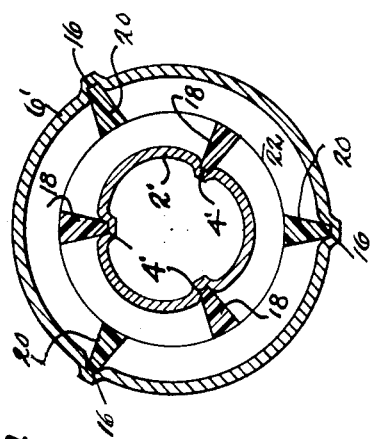
Fig. 4 is a cross-section showing the indentations in the sheath or outer conductor for receiving the insulating supports spiraling in a direction opposite to that of the corresponding indentations in the central conductor.

The inductance may be increased still further by the construction illustrated in Figs. 4 and 5. In this embodiment of our invention the central conductor 2' is provided with indentations 4' spiraling about the conductor, as in Fig. 3, while the outer conductor or sheath 6' is provided with spiraled indentations 16. The indentations 4' are spiraled in the opposite hand to the indentations 16. Fitted into each indentation 4' in the surface of the inner or central conductor 2' is an insulating support 18. These supports terminate short of the outer conductor 6', say, for example, midway of the space between the two conductors. Fitted into each indentation 16 of the outer conductor 6' is an insulating support 20. Because the indentations 4' and 16 spiral in opposed directions, the supports 18 and 20 will cross each other to form bearing points along the line 22. As will be seen from the drawings, the base of each of the supports 18 and 20 has been widened somewhat to give a larger bearing surface. In the operation of this cable, it will be appreciated that with the identations 4' and 16 of sufficient depth with respect to the other dimensions the current spirals around conductor 2' in one direction and returns along the outer conductor 6' spiraling in the opposite direction. This gives an increase in inductance in the cable circuit.

Figure 6:
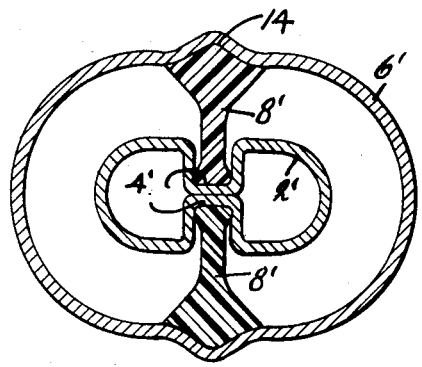
Fig. 6 is a cross-section of a cable embodying our invention in which the cable is more or less oval in form.

In the cable of Fig. 6 the inner or central conductor 2' is provided with indentations 4', which, it is to be understood, may extend straight away, as in Fig. 1, or spiral about the conductor, as in Fig. 3. The outer conductor or sheath 6' is provided with indentations 14, spiraling about the conductor in the same hand as indentations 4', or which extend straight away, as may be desired. Insulating supports 8' for the central conductor 2' extend into the indentations 4' and 14. The cable in its entirety is more or less oval in cross-section. The operation of this cable is similar to that described in connection with Figs. 1 and 3. It will be seen that this construction provides that the radial distance between the two conductors at points of support exceeds the radial distance between conductors at all other points. It is to be understood that the width of the indentations 4' is so chosen in relation to the other dimensions of the cable that the current flows with equal density over the outer face of the inner conductor except within the conductor indentations 4'.

Figure 7:
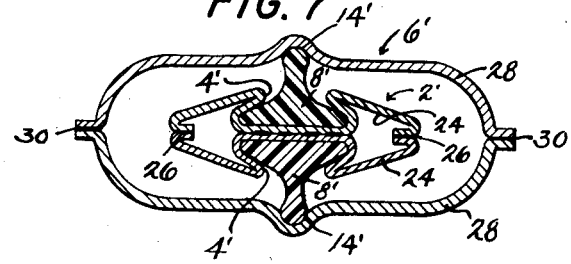
Fig. 7 is a cross-section of another embodiment of our invention in which the cable is more or less oval in form and in which the central conductor is of new and novel construction.
Figure 8:
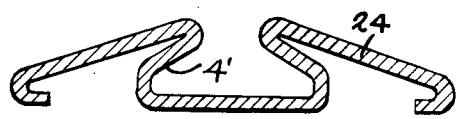
Fig. 8 is an enlarged cross-section of one half of the conductor of Fig. 7.

In Figs. 7 and 8 we have illustrated another embodiment of our invention, in which the cable, as in Fig. 6, is more or less oval in cross-section. The inner or central conductor 2' of this cable is made from two superposed flat strips 24, shaped as best seen in Fig. 8, the strips being spotwelded to each other along their abutting flat areas within indentations 4' and/or their longitudinal edges, as seen at 26. The outer conductor or sheath 6' is made of two strips of metal 28, shaped as shown, and welded to each other along their longitudinal edges, as seen at 30. The upper and lower faces of the inner or central conductor 2', as viewed in Fig. 7, are so shaped as to provide each with an indentation 4' extending lengthwise of the conductor. The inner face of each of the strips 28 composing the outer conductor 6' is provided with a longitudinally extending indentation 14'.

Insulating supports 8' of polyethylene, for example, or other suitable material, extend between the inner and outer conductors 2' and 6', properly to support the inner or central conductor within the outer conductor, the edges of the insulating supports extending into the indentations 4' of the inner conductor and the opposed indentations 14' of the outer conductor or sheath. It is to be noted that the distance between the inner or central conductor 2' and the outer conductor or sheath 6' is great at the major axis of the cable, this distance decreasing as the insulating supports 8' are approached, until near these supports the distance again becomes great. This shape is selected so that for the range of frequencies to be carried the current distribution is fairly uniform over the face of the central conductor 2', with practically no current being carried on those portions of the conductor 2' which are in contact with the insulating supports 8'.

Figure 9:
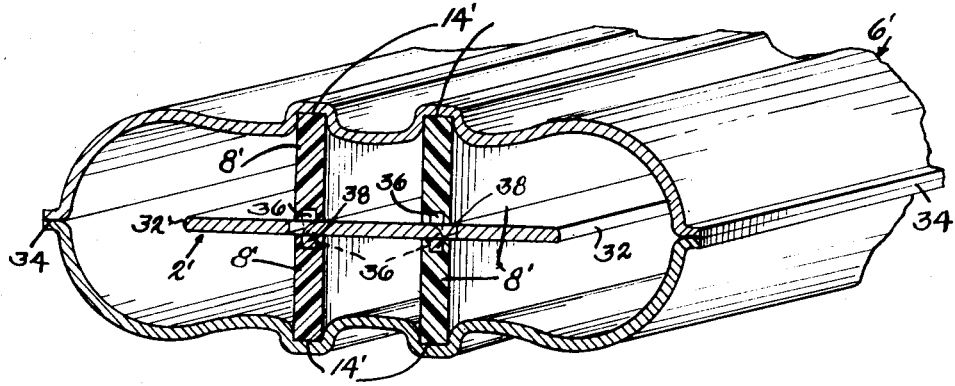
Fig. 9 is an isometric, fragmentary view of still another embodiment of our invention.
Figure 10:
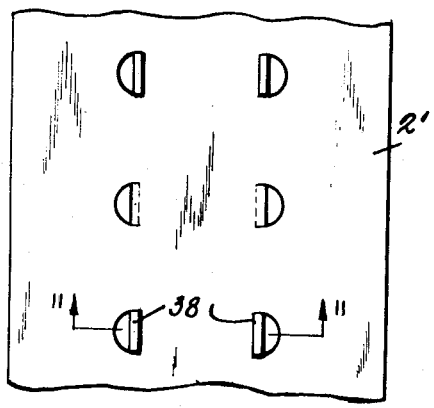
Fig. 10 is an elevational, fragmentary view of the central conductor of Fig. 9.
Figure 11:
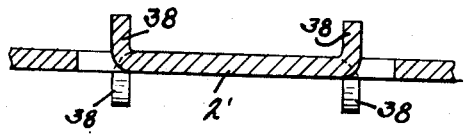
Fig. 11 is a view taken along the line 11—11 of Fig. 10.

In the cable of Figs. 9, 10, and 11 we again show a cable generally oval in cross-section. This cable comprises an inner or central conductor 2' and an outer conductor or sheath 6'. The inner conductor 2' is composed of a flat metal strip—copper or aluminum, for example—with rounded edges 32. The outer conductor 6' is composed of two metal strips, welded to each other along their edges, as shown at 34; the inner face of each of the strips composing the outer conductor or sheath is provided with indentations 14'. The inner conductor 2' is supported within the outer conductor 6' by supports 8' of suitable insulating material, such as polyethylene, for example. The outer edges of these insulating supports extend into the indentations 14' of the outer conductor, while the inner edges are provided with a longitudinal slit 36 for engagement with projections 38, with which the two faces of the central conductor 2' are provided. In this embodiment of our invention it is to be noted that the distance between the two conductors 2' and 6' is greatest at the major axis of the cable and gradually diminishes as the center of the inner conductor is approached. This tends to spread the current density evenly over the surface of the inner conductor, as distinguished from having the inner conductor equidistant from the outer conductor at all areas, in which event the current would flow predominantly at or near the edges 32 of the conductor. By providing the outwardly extending indentations 14' in the inner face of the outer conductor 6', the distance between the two conductors is again increased, which greatly diminishes the current density in those areas or eliminates the current flow in the two conductors at those portions of the conductors contacted by the insulating supports 8'.

It will be appreciated from all of the foregoing that our invention provides a high-frequency cable of the so-called air-dielectric type in which the current flow is widely distributed over surfaces touching only air, thereby providing a cable having a very low order of losses, low attenuation, and high transmission efficiency. It will be appreciated furthermore that our improved construction provides a cable of the air-dielectric type in which current density is nil or eliminated at areas of insulating supports, so that the losses occurring in the insulating supports of conventional designs are eliminated to a major extent.

It is to be understood that changes may be made in the details of construction and arrangement of parts hereinabove described wtihout departure from the spirit and scope of our invention.

What we claim is:

1. A high-frequency, air-dielectric cable comprising, in combination, an inner or central conductor and a surrounding outer conductor or sheath; and dielectric supports between the two conductors, contacting the two conductors throughout the length of the conductors, for supporting the inner conductor within the outer conductor in spaced relation thereto, the minimum radial distance between the areas of contact of each support with the two conductors throughout the length of each support being in excess of the radial distance between the two conductors at all other areas, thereby substantially reducing the electrical losses in the said supports.

2. A high-frequency, air-dielectric cable comprising, in combination, an inner or central conductor and a surrounding outer conductor or sheath; at least one of said conductors being indented longitudinally throughout its length; and dielectric supports between the two conductors for supporting the inner conductor within the outer conductor; at least one of said conductors being non-circular in cross-section for promoting uniform current distribution over the faces of the conductors except in said indented areas, where current flow is minimum or nil; said supports being positioned at said indentations thereby to effect a substantial reduction in the electrical losses in the said supports.

3. A high-frequency, air-dielectric cable comprising, in combination, an inner or central conductor and a surrounding outer conductor or sheath; and insulating supports between the two conductors, contacting the conductors throughout the length of the conductors, for supporting the inner conductor within the outer conductor, at least one of said conductors being indented for the reception of said insulating supports and to provide areas of contact for the supports at which the shortest radial distance between the two conductors exceeds the radial distance between the two conductors at any other area.

4. A high-frequency, air-dielectric cable comprising, in combination, an inner conductor; a surrounding outer conductor; and supporting strips of insulation between the two conductors for supporting the inner conductor within the outer conductor, said supporting strips extending straight away along the inner conductor and contacting both conductors throughout the length of the conductors; at least one of said conductors being so shaped at the support areas that the shortest radial distance between the two conductors at the areas where the strips contact both conductors exceeds the radial distance between the two conductors at any other area.

5. A high-frequency, air-dielectric cable comprising, in combination, an inner conductor; a surrounding outer conductor; and insulating supporting strips between the two conductors for supporting the inner conductor within the outer conductor, said supporting strips spiraling about the inner conductor and contacting both conductors throughout the length of the conductors; at least one of said conductors being so shaped that at the support areas the radial distance between the two conductors at the areas where the strips contact both conductors is in excess of the distance between the two conductors at any other area.

6. A high-frequency, air-dielectric cable comprising, in combination, an inner conductor; a surrounding outer conductor, the surface of the inner conductor being spirally indented, and the opposed face of the outer conductor being spirally indented in the opposite hand; insulating strips seated in the indentations of the inner conductor and contacting the conductor throughout the length of the conductor; and insulating strips set into the indentations of the outer conductor and contacting the conductor throughout the length of the conductor, said strips crossing and contacting each other, thereby to support the inner conductor within the outer conductor, the shortest radial distance between the area of contact of each strip with a conductor and with the opposite conductor exceeds the radial distance between conductors at all other areas.

7. A high-frequency, air-dielectric cable comprising, in combination, an inner conductor; a surrounding outer conductor, the surface of the inner conductor being spirally indented, and the opposed face of the outer conductor being spirally indented in the opposite hand; insulating strips seated in the indentations of the inner conductor and contacting the conductor throughout the length of the conductor; and insulating strips set into the indentations of the outer conductor and contacting the conductor throughout the length of the conductor, said strips crossing and contacting each other, thereby to support the inner conductor within the outer conductor; the shortest radial distance between the area of contact of each strip with a conductor and the opposite conductor at the areas where the strips cross and contact each other exceeding the radial distance between conductors at all other areas.

8. A high-frequency, air-dielectric cable, non-circular in cross-section and comprising, in combination, a central conductor and a surrounding outer conductor; and insulating supports between the two, said supports contacting the conductors throughout the length of the conductors, to support the inner conductor within the outer conductor in spaced relation thereto, said inner conductor being indented, and said supports extending into said indentations; the radial distance between the two conductors at the areas between indentations being substantially constant, and the width of said indentations being such that the current flows with substantially equal density along the outer face of the inner conductor except within said indentations, where the current density decreases, the shortest radial distance between conductors at the areas of contact of each strip with the two conductors exceeding the radial distance between conductors at all other areas.

9. A high-frequency, air-dielectric cable, non-circular in cross-section and comprising, in combination, a central conductor and a surrounding outer conductor; and insulating supports between the two conductors contacting both conductors throughout the length of the conductors, and supporting the inner conductor within the outer conductor in spaced relation thereto; the two conductors being so shaped that the distance between them is greatest at the major axis of the cable and gradually diminishes as the insulating supports are approached; the distance between conductors at the areas of contact of the supports with the conductors again increasing, thereby to effect substantially uniform current distribution over the outer face of the inner conductor, the shortest radial distance between the two conductors at the areas of contact of each strip with the conductors exceeding the radial distance between conductors at all other areas, whereby substantially no current is carried on those portions of the inner conductor which are in contact with the said supports.

10. A high-frequency, air-dielectric cable, non-circular in cross-section and comprising, in combination, a central conductor and a surrounding outer conductor; and insulating supports between the two to support the inner conductor within the outer conductor in spaced relation thereto, said inner conductor being hollow and comprising two metal strips disposed in superposed relation and welded to each other along their longitudinal edges, each of said strips being bent inwardly longitudinally of the strips to provide an indentation in each strip for the reception of said insulating supports; the distance between the inner conductor and the outer conductor being greatest at the major axis of the cable and diminishing as the insulating supports are approached, the distance between conductors at the areas of contact of the insulating supports with the conductors again increasing.

11. A high-frequency, air-dielectric cable, non-circular in cross-section and comprising, in combination, a central conductor and a surrounding outer conductor; and insulating supports between the two to support the inner conductor within the outer conductor in spaced relation thereto, said inner conductor comprising a flat metal strip provided on each face with means to fix the inner edges of said insulating supports relatively to the inner conductor, said outer conductor being provided on its inner face with indentations, extending longitudinally of the outer conductor, into which the outer edges of the said insulating supports extend.

12. A high-frequency, air-dielectric cable, non-circular in cross-section and comprising, in combination, a central conductor and a surrounding outer conductor; and insulating supports between the two to support the inner conductor within the outer conductor in spaced relation thereto, said inner conductor comprising a flat metal strip provided on each face with upstanding projections, said outer conductor being provided on its inner face with indentations extending longitudinally of the conductor, said projections and indentations contacting the inner and outer edges of said insulating supports to fix the supports relatively to the conductors; the conductors being so shaped that the distance between conductors is greatest at the major axis of the cable and gradually diminishes as the center of the inner conductor is approached, the distance between the two conductors at the areas of contact of the insulating supports then increasing.

13. A high-frequency, air-dielectric cable comprising, in combination, an inner or central conductor and a surrounding outer conductor or sheath; and dielectric supports between the two conductors, contacting the two conductors throughout the length of the conductors, for supporting the inner conductor within the outer conductor in spaced relation thereto, the distance between conductors at said supports being greater than immediately adjacent the supports, the contour of the conductors between adjacent supports being such that current distribution in these areas is uniform, whereby the electrical losses in said supports are substantially reduced.

14. A high-frequency, air-dielectric cable, non-circular in cross-section and comprising, in combination, a central conductor and a surrounding outer conductor; and insulating supports between the two to support the inner conductor within the outer conductor in spaced relation thereto, said supports contacting the two conductors throughout the length of the conductors, said inner conductor comprising a flat metal strip provided on each face with means to fix the inner edges of said insulating supports relatively to the inner conductor, said outer conductor being provided on its inner face with means extending longitudinally of the outer conductor and cooperating with the outer edges of the said insulating supports to fix said outer edges of the supports relatively to the outer conductor.

15. A high-frequency, air-dielectric cable, non-circular in cross-section and comprising, in combination, a central conductor and a surrounding outer conductor; and insulating supports between the two to support the inner conductor within the outer conductor in spaced relation thereto, said inner conductor comprising a flat metal strip provided on each face with means cooperating with the inner edges of said supports to fix the supports relatively to the inner conductor, said outer conductor being provided on its inner face with means cooperating with the outer edges of said supports to fix the supports relatively to the outer conductor, the conductors being so shaped that the distance between conductors is greatest at the major axis of the cable and gradually diminishes as the center of the inner conductor is approached, the distance between the two conductors at the areas of contact of the supports with the conductors then increasing.

References Cited in the file of this patent

UNITED STATES PATENTS

| | | |
|---|---|---|
| 449,400 | Bishop | Mar. 31, 1891 |
| 451,586 | Williams | May 5, 1891 |
| 2,437,482 | Salisbury | Mar. 9, 1948 |
| 2,444,206 | Pease | June 29, 1948 |
| 2,847,499 | Peterson | Aug. 12, 1958 |

FOREIGN PATENTS

| | | |
|---|---|---|
| 561,429 | France | Aug. 6, 1923 |